US006979140B2

(12) United States Patent
McLoone et al.

(10) Patent No.: US 6,979,140 B2
(45) Date of Patent: *Dec. 27, 2005

(54) KEYBOARD WITH IMPROVED FUNCTION AND EDITING SECTIONS

(75) Inventors: Hugh E. McLoone, Bellevue, WA (US); James H. Cauthorn, Seattle, WA (US); Jonathan A. Hayes, Seattle, WA (US); Kenneth V. Fry, Seattle, WA (US); William H. Vong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/948,676

(22) Filed: Sep. 24, 2004

(65) Prior Publication Data

US 2005/0036815 A1  Feb. 17, 2005

Related U.S. Application Data

(63) Continuation of application No. 09/843,799, filed on Apr. 30, 2001, now Pat. No. 6,910,818.

(51) Int. Cl.$^7$ ................................................. B41J 5/08
(52) U.S. Cl. ....................... 400/486; 400/489; 400/472
(58) Field of Search ............................... 400/472–489; 345/168, 172; 341/21, 22, 26, 176; 434/227, 434/231, 232

(56) References Cited

U.S. PATENT DOCUMENTS

| 4,455,618 A | 6/1984 | Walden et al. |
| 4,491,933 A | 1/1985 | Ursin et al. |
| 4,698,618 A | 10/1987 | Liuzzo et al. |
| 4,974,183 A | 11/1990 | Miller |

(Continued)

FOREIGN PATENT DOCUMENTS

DE  200 03 668 U1  2/2000

(Continued)

OTHER PUBLICATIONS http://www.dgp.utoronto.ca/OTP/papers/bill.buxton/2Hnavigation.html, Two-Handed Document Navigation, 5 pages, Sep. 13, 2000.

(Continued)

*Primary Examiner*—Minh Chau
(74) *Attorney, Agent, or Firm*—Banner & Witcoff, Ltd.

(57) ABSTRACT

A keyboard having an improved function key section and an improved editing section. A row of keys is located behind the alphanumeric section. The row of keys includes individual predefined command keys. The groupings of the predefined command keys may be made based on the functionality of the keys, their use on common applications or programs, and/or other by other grouping techniques. Further, the keys within each group may be ordered based on chronological order of use, frequency of use, or by a correlation to a graphical toolbar. Each of at least two adjacent groupings of keys behind the alphanumeric region consists of exactly three keys, and each of at least three adjacent key groupings in the entire row consists of exactly three keys. The keys are each capable of functioning as predetermined command keys in a first mode and standard function keys in a second mode. A Function Lock key may be used to convert these keys from their use in one mode as their predefined command keys to another mode where they become standard function keys. These keys are preferably primarily labeled as their command keys and secondarily labeled as standard function keys. The editing section includes a first key cluster having a plurality of keys forming a two dimensional array of cells. At least one key occupies a single cell and a Delete key occupies at least two cells. A key cluster is located behind and spaced from the editing section, and consists of an Undo key and a Redo key.

4 Claims, 3 Drawing Sheets

U.S. PATENT DOCUMENTS

| | | | |
|---|---|---|---|
| 5,073,050 | A | 12/1991 | Andrews |
| 5,119,078 | A | 6/1992 | Grant |
| 5,129,747 | A | 7/1992 | Hutchison |
| 5,334,976 | A | 8/1994 | Wang |
| 5,360,280 | A | 11/1994 | Camacho et al. |
| 5,372,441 | A | 12/1994 | Louis |
| 5,390,005 | A | 2/1995 | Kimoto et al. |
| 5,436,954 | A | 7/1995 | Nishiyama et al. |
| 5,438,331 | A | 8/1995 | Gilligan et al. |
| D362,432 | S | 9/1995 | Paull et al. |
| 5,476,332 | A | 12/1995 | Cleveland, Jr. |
| 5,600,313 | A | 2/1997 | Freedman |
| 5,640,176 | A * | 6/1997 | Mundt et al. ............... 715/839 |
| D386,169 | S | 11/1997 | Wang |
| 5,790,103 | A | 8/1998 | Willner |
| 5,825,612 | A | 10/1998 | Aubuchon et al. |
| D410,454 | S | 6/1999 | Chen |
| 5,936,614 | A | 8/1999 | An et al. |
| D417,210 | S | 11/1999 | Prokop |
| 6,011,495 | A | 1/2000 | Chen |
| D428,613 | S | 7/2000 | Chen |
| 6,092,903 | A | 7/2000 | Higgins, Jr. |
| D428,889 | S | 8/2000 | Chen |
| 6,098,086 | A | 8/2000 | Krueger et al. |
| 6,111,527 | A | 8/2000 | Susel |
| 6,142,687 | A | 11/2000 | Lisak |
| 6,154,600 | A | 11/2000 | Newman et al. |
| 6,198,474 | B1 | 3/2001 | Roylance |
| 6,219,021 | B1 | 4/2001 | Izumi |
| 6,241,406 | B1 | 6/2001 | Yan |
| 6,256,020 | B1 | 7/2001 | Pabon et al. |
| 6,278,442 | B1 | 8/2001 | Griffin et al. |
| 6,351,225 | B1 | 2/2002 | Moreno |
| 6,469,694 | B1 | 10/2002 | Mikan |
| 6,786,731 | B1 | 9/2004 | Williams |
| 6,862,017 | B2 | 3/2005 | Chen |
| 2001/0005199 | A1 | 6/2001 | Anderson |
| 2002/0154097 | A1 | 10/2002 | Chen |
| 2003/0210232 | A1 | 11/2003 | Chen |
| 2004/0086314 | A1 | 5/2004 | Chen et al. |

FOREIGN PATENT DOCUMENTS

| | | |
|---|---|---|
| EP | 0 863 456 A1 | 9/1998 |
| JP | 05019933 A | 1/1993 |
| SE | 9903443 | 10/2000 |
| WO | WO 97/27529 | 7/1997 |

OTHER PUBLICATIONS http://www.dgp.utoronto.ca/OTP.papers/bill.buxton/2Hands.html, A Study in Two-handed Input, 10 pages, Sep. 13, 2000.

http://cogprints.soton.ac.uk/archives/psyc/papers/199803/199803026/doc.html/imb_ B7.html, Asymmetric Division of Labor in Human Skilled Bimanual Action: The Kinematic Chain as a Model, 28 pages, May 12, 1999.

Myers, Brad A., et al., Abstract, Two-Handed Input Using A PDA And A Mouse, 8 sheets, date unknown.

MacKenzie, Scott, Slide presentation, (How) To Scroll or (How) Not To Scroll, 46 Sheets, 1998.

Zhai, Shumin, Slide presentation, Input devices and techniques: Multi0DOF, Multi-hand, Multi-stream, Multi-functional, and Multi-modal, 7 sheets, 1999.

IBM Corp., Input Device fir OS/2, IBM Technical Disclosure Bulletin, vol., (unknown), No. 11, Apr. 1991, 1 sheet, p. 255.

Lifestyle Magazine, Design article, Typing Without Keys, An Epidemic of Injuries among office workers prompts a search for a better keyboard, 2 sheets, (date of article unknown, but prior to filing of this application).

Ergnomixx, MyKey, The Shape of Comfort, (date unknown, but prior to filing of this application), 1 sheet.

Forbes, Computers/Communications, article, My aching handsl, Dec. 20, 1993, 1 sheet, p. 246.

ISO/IEC 9995-1 International Stand ard, information technology—Keyboard layouts for text and office systems—Part 1: General principles governing keyboard layouts, 16 pages, First edition, Aug. 15, 1994.

ISO/IEC 9995-2 International Standard, information technology—Keyboard layouts for text and office systems—Part 2: Alphanumeric section, 11 pages, First edition, Aug. 15, 1994.

ISO/IEC 9995-3 International Standard, information technology—Keyboard layouts for text and office systems—Part 3: Complementary layouts of the alphanumeric zone of the alphanumeric section, 9 pages, First edition, Aug. 15, 1994.

ISO/IEC 9995-4 International Standard, information technology—Keyboard layouts for text and office systems—Part 4: Numeric section, 11 pages, First edition, Aug. 15, 1994.

ISO/IEC 9995-5 International Standard, information technology—Keyboard layouts for text and office systems—Part 5: Editing section , 11 pages, First edition, Aug. 15, 1994.

SO/IEC 9995-6 International Standard, information technology—Keyboard layouts for text and office systems—Part 6: Function Section, 6 pages, First edition, Aug. 15, 1994.

ISO/IEC 9995-6 International Standard, information technology—Keyboard layouts for text and office systems—Part 6: Function Section, 6 pages, First edition, Aug. 15, 1994.

* cited by examiner

KEYBOARD WITH IMPROVED FUNCTION AND EDITING SECTIONS

CROSS REFERENCE TO RELATED APPLICATIONS

This application is a continuation of Ser. No. 09/843,799 (now U.S. Pat. No. 6,910,818), filed Apr. 30, 2001, the entire contents of which are incorporated herein by reference.

FIELD OF THE INVENTION

The present invention generally relates to keyboards for entering data into text and office systems such as computers. More specifically, the present invention relates to a keyboard having improved function and editing sections.

BACKGROUND OF THE INVENTION

While there are many different keyboard designs, the general layout for many keyboards for text and office systems follows the International Standard ISO/IEC 9995-1. This standard layout is shown in FIG. 1. A standard keyboard 10 layout includes an alphanumeric section 12, an editing section 14, a numeric section 16, and a function section 18. The alphanumeric section 12, sometimes referred to as the "QWERTY" section, typically includes keys for each of the letters of the alphabet, the digits 0–9, and various punctuation symbols, and occupies zones ZA0 to ZA4. The editing section 14, located to the right of the alphanumeric section 12, typically includes four directional arrow keys for controlling the cursor, and Insert, Delete, Home, End, PageUp, and PageDown keys, and occupies zones ZE0 to ZE2. The numeric section 16 is located to the right of the editing section 14, typically includes keys for each of the digits 0–9 and arithmetic operation symbol keys, and occupies zones ZN0 to ZN6.

The function section 18 includes function keys and may be located in one or more of the zones ZF0 to ZF4. As shown in FIG. 1, zones ZF0, ZF3, and ZF4 are behind the alphanumeric section 12, the editing section 14, and the numeric section 16, respectively, and zone ZF1 is located to the left of alphanumeric section 12. Zone ZF2 normally consists of an Escape or "Esc" key used interchagably herein.

The function keys in zone ZF0 commonly consist of ten or twelve standard keys. These standard function keys are individually labeled F1 through Fx where x is usually 10 or 12. The standard function keys when pressed alone or pressed simultaneously with the Alt key, the Control key, and/or the Shift key, have different results depending on which program is running. For example, in Microsoft WORD, a word processing program, simultaneously pressing the Alt key, the Shift key, and the F2 key produces a File Save command. Simultaneously pressing the Control key, the Alt key and the F2 key produces a File Open command. Pressing the Alt key with the F4 key produces a Quit command. Pressing the F9 key produces an Update command that updates selected data fields. Simultaneously pressing the Shift key and the F7 key activates the Thesaurus. In another example, pressing the Control key and the F10 key produces a command to Maximize the document window. In all, there are well over 50 commands in Microsoft WORD7 that can be invoked by the shortcut of pressing the function keys F1–F12 alone or in combination with the Alt, Control, and/or Shift keys.

The large number of possible key combinations resulting with standard function key usage has inherent drawbacks that limit the effectiveness of the function keys. First, keyboard users have to remember which commands can be produced and which specific key combinations are required to be pressed to achieve the desired commands. The task of memorizing the vast menu of commands available and the specific required key combinations for multiple applications can be a difficult task for many users. This memorization task is further complicated because the function keys alone and in combination with other keys can produce different commands depending upon the application that is running at that time. Even if the key combinations are memorized, the thought process used to invoke the available commands and the associated combination of keystrokes can cause a break of concentration, slow down the text entry, and/or decrease the efficiency of other activities associated with the use of the keyboard.

Some portable computing devices that do not have full-size keyboards have utilized an "Fn" key. This Fn key may be pressed simultaneously with other keys to produce special actions that vary depending on which program is running. This Fn key has been used with standard function keys to launch various programs. However, multi-key actuations such as this can be relatively time consuming and cause unnecessary distraction.

In addition, the physical layout on the keyboard of the function keys, such as F1–F12, is less than optimal. The conventional layout makes it difficult for users to associate the location of the available commands relative to the function keys. If twelve function keys F1–F12 are used, they are most commonly found as one group of twelve keys or as three groups of four keys. However, because these keys are not grouped or otherwise organized in a manner that is efficient and intuitive, most users rarely, if ever, utilize these keys.

Further, the editing section 14 of the keyboard typically includes four arrow keys for controlling the cursor, and Insert, Delete, Home, End, PageUp, and PageDown keys, and occupies zones ZE0 to ZE2. In many conventional keyboards, the Insert and Delete keys are placed immediately next to each other with the Insert key being behind the Delete key. However, due to its location, the Insert key can be a trap, as it is often pressed by accident. The inadvertent pressing of the Insert key can cause a change to an "overwrite" mode and make unintended changes to the open document. Further, as the Delete key is one of the most frequently accessed editing keys, there is an increased possibility that the Insert key is inadvertently pressed when the Delete key is the intended key.

Accordingly, a more convenient keyboard having an improved function key section, editing section, and/or surrounding keys is needed.

SUMMARY OF THE INVENTION

It is an aspect of the present invention to provide an improved keyboard having improved alphanumeric and editing sections.

In a feature of the invention, a row of keys is provided behind the alphanumeric or QWERTY section of the keyboard. The row of keys includes individual command keys. Some preferred command keys are Find, Desktop (i.e., Minimize All), New, Open, Close, Reply (E-Mail), Forward (E-Mail), Send (E-Mail), Spell, Save, and Print. At least some of these keys are preferably grouped in threes. The groupings of the predefined command keys may be arranged based on the functionality of the keys, use in common applications or programs, and/or other grouping techniques.

Further, the keys within each group may be ordered based on expected chronological order of use, frequency of use, or by a correlation to a graphical toolbar layout on a display. A Function Lock key may be used to convert these keys from their use in one mode as their predefined command keys to another mode where they become standard function keys.

In an aspect of the present invention a keyboard includes an alphanumeric section and a row of keys spaced from the alphanumeric section. The row of keys includes first and second laterally spaced and adjacent key clusters that are located behind the alphanumeric section. The first and second key clusters each consists of exactly three keys.

In another aspect, a keyboard includes an alphanumeric section, an editing section, a numeric section, and a laterally extending row of keys. The row of keys is located behind and spaced from the alphanumeric section, the editing section, and/or the numeric section. The row of keys has a first key cluster, a second key cluster adjacent to and laterally spaced from the first key cluster, and a third key cluster adjacent to and laterally spaced from the second key cluster. Each of the first, second, and third key clusters consists of exactly three keys.

In another aspect of the invention, a keyboard includes a plurality of keys each capable of functioning as predetermined command keys in a first mode and standard function keys in a second mode, and a function lock selector. The function lock selector is actuable to change the functionality of the plurality of keys between the first and the second modes and maintain the mode until a subsequent actuation of the function lock device is performed.

In another aspect of the present invention, a keyboard includes a plurality of keys each capable of functioning as predetermined command keys in a first mode and standard function keys in a second mode. The keys are secondarily labeled as standard function keys, i.e., the keys are secondarily labeled as one of F1 to Fx.

In another aspect of the invention, a keyboard includes an alphanumeric section and an editing section laterally disposed from the alphanumeric section. The editing section includes a first key cluster having a plurality of keys forming a two dimensional array of cells. The plurality of keys includes at least one key occupying a single cell and a Delete key that occupies at least two cells.

In yet another aspect of the current invention, a keyboard includes an alphanumeric section, an editing section laterally disposed from the alphanumeric section, and a key cluster. The key cluster consists of an Undo key and a Redo key and is located behind and spaced from the editing section.

DETAILED DESCRIPTION OF THE INVENTION

Figure 1:
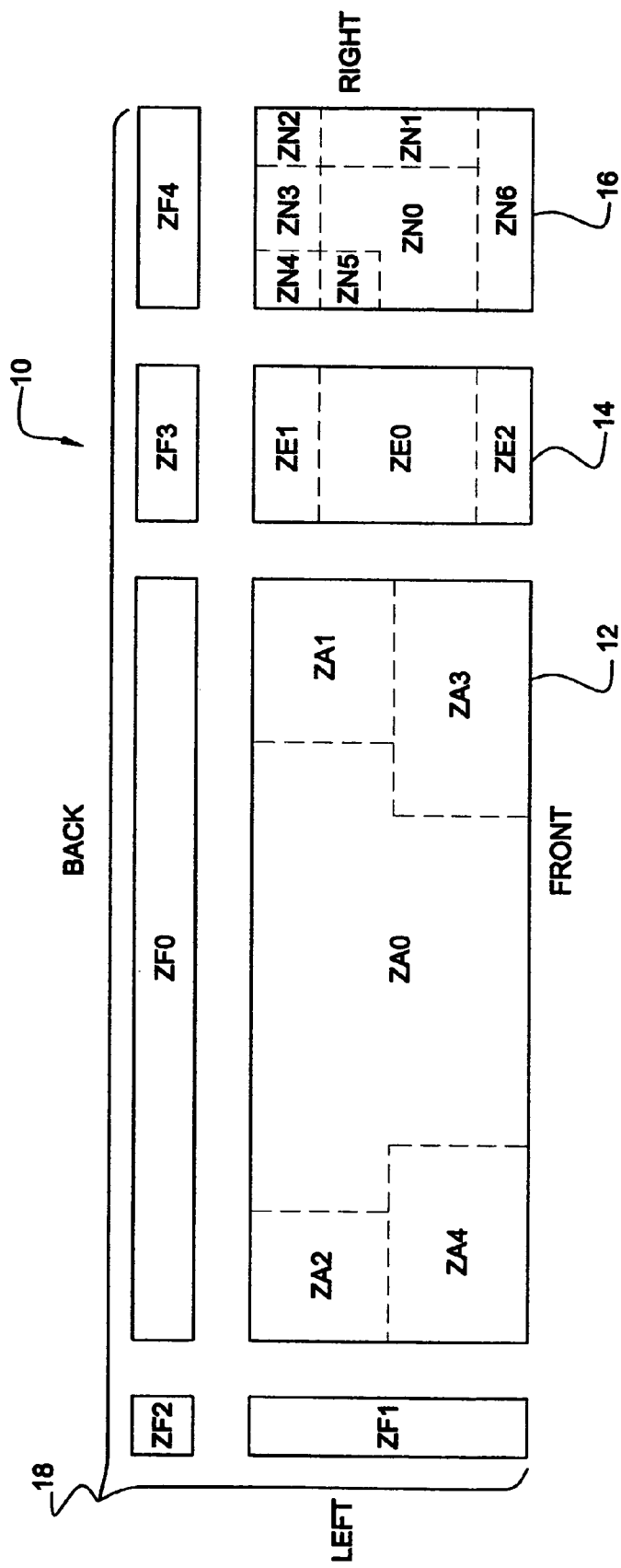
FIG. 1 is a schematic plan view showing the zones of various keyboard regions as set forth in the International Standard ISO/IEC 9995-1.

As a preface to this section, a few terms as used herein are defined.

A "number pad", as used herein, is defined as the group of keys occupying the numeric section of a keyboard as set forth in International Standard ISO/IEC 9995-1, which is hereby incorporated by reference in its entirety.

A "key cluster" is defined as a group of keys, each of which is immediately adjacent, or in close proximity, to at least another key within the cluster and set apart from other keys on the keyboard by a distance larger than the spacing between the adjacent keys in the cluster and by a portion of the keyboard housing.

A key is "labeled" as a certain type of key when it includes indicia thereon or immediately adjacent thereto corresponding to the image to be provided or associated function to be performed when that key is pressed. A key may be "primarily labeled," and may further be "secondarily labeled." For example, when activated or depressed alone, the digit 7 key may cause a symbol of the numeral 7 to be imaged. In another example, when activated or depressed alone, the Tab key may provide a Tab command function to be executed.

If a key has only one indicia thereon or immediately adjacent thereto, it is "primarily labeled" as to the image to be provided and/or the associated function to be performed when that key is pressed. A key having multiple distinct indicia thereon is both "primarily labeled" and "secondarily labeled." That key is "primarily labeled" as a certain key when it has indicia corresponding to the image to be displayed and/or function to be performed that is more visually apparent or dominant with respect to any other indicia of that key. That key is "secondarily labeled" as a certain key when it has indicia corresponding to the image to be displayed and/or associated function to be performed which is less visually apparent with respect to other indicia of that key. Indicia may be dominant or more visually apparent relative to other indicia of the key based on its position on or relative to the key, the color contrast of the indicia relative to the key, the size of the indicia, or any other technique known for accentuating or de-accentuating indicia relative to each other. For example, a key having an upper surface and a smaller visible front face surface as viewed during normal usage, with indicia on both surfaces, would be primarily labeled with the indicia on the upper surface and secondarily labeled with the second indicia on the smaller front surface. Similarly, a key that is colored black, having a first indicia printed thereon that is white and a second indicia printed thereon that is red, would be primarily labeled corresponding to the first indicia and secondarily labeled corresponding to the second indicia as a white-on-black contrast would make the first indicia more apparent than the red-on-black contrast of the second indicia.

A "lock" key is a keyboard key used to toggle or switch each of a group of keys between a first type of key and a second type of key. For example, a Num Lock key may toggle a group of keys in the numeric section between acting as digit keys and acting as cursor control keys. A Caps Lock key may toggle a group of keys in the alphanumeric section between acting as capital letter keys and acting as lower case letter keys.

A Standard Function Key on a computer keyboard is one of a sequence of special keys labeled "F1" through Fn (usually up to "F12") that can be or is assigned a specific function. A standard function key may be used to provide a specific command when it is pressed alone or in combination with the Shift key, the Alt key, and/or the Control key.

"File level" commands are commands associated with the opening, closing, saving, or printing of an existing file or the opening of a new file.

"Document Completion" commands are commands broadly associated with the checking and reviewing of a document, frequently near the completion of some stage of preparation of a document, and may include Spell, Grammar, Print, and Save.

"Edit" commands are commands for editing documents and may include Undo, Redo, and well as command keys normally found in the editing section of a keyboard.

"E-Mail" commands are commands associated with electronic mailing applications and may include New, Close, Forward, Reply, Open, Spell, Send, Delete, Save, and/or Print.

An "ungrouped" or "isolated" key is a key surrounded entirely (i.e., in front, behind, left, and right) by an outer housing surface of the keyboard and not being within a key cluster.

Figure 2:
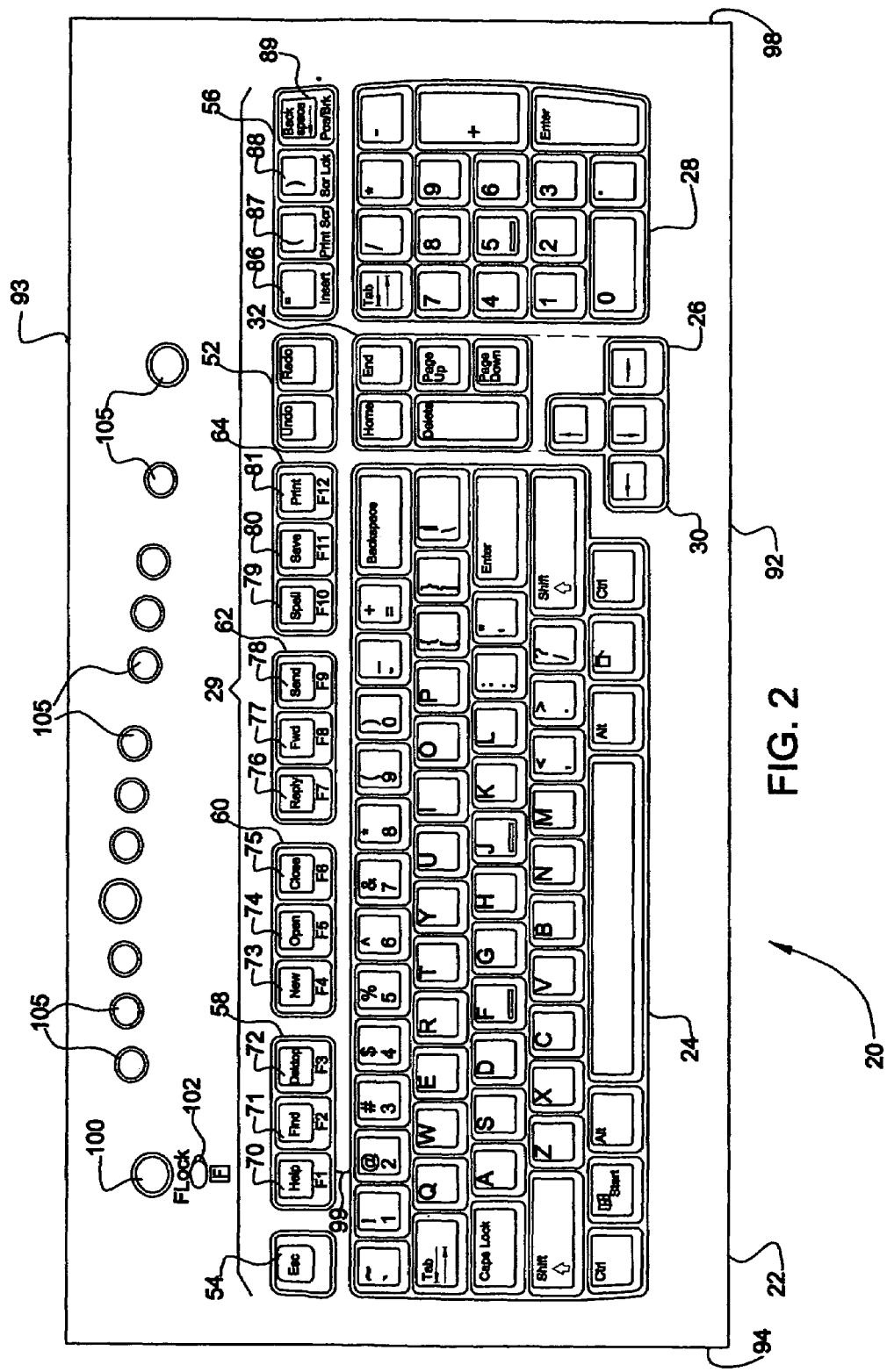
FIG. 2 is a plan view of an exemplary keyboard according to one or more aspects of the present invention.
Figure 3:
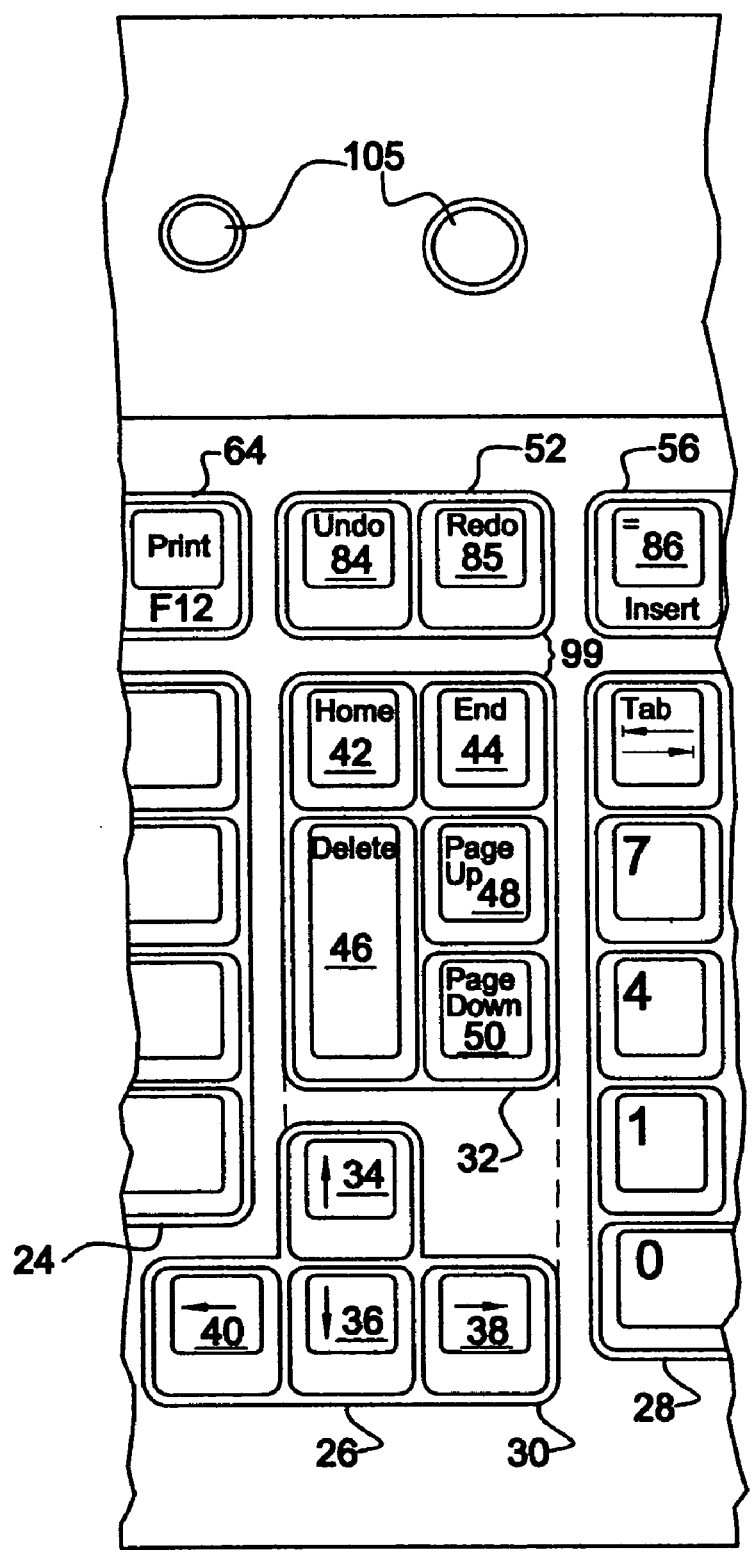
FIG. 3 is an enlarged plan view of the editing section and adjacent area of the keyboard of FIG. 2.

An exemplary keyboard design of the present invention is shown in FIGS. 2–3 and designated by reference numeral 20. For reference purposes, the keyboard 20 has a front edge 92 adjacent the user during use, and a back edge 93 distal from the user during use. Accordingly, an object is "behind" another object when it is between that object and the back edge 93. An object is "directly behind" another object when it is between that object and the back edge 93 and at least partially located within the lateral bounds of that object extending in the front-to-back direction. An object is "entirely directly behind" another object when it is between that object and the back edge 93 and entirely located within the lateral bounds of that object extending in the front-to-back direction. An object is "in front of" another object when it is between that object and the front edge 92. Further, the keyboard 20 also has left and right edges 94 and 95. The direction "lateral" defines the general directions from the left edge 94 to the right edge 95 and from the right edge 95 to the left edge 94.

The keyboard 20 includes an alphanumeric section 24, an editing section 26, a numeric section 28, and a function section 29. The alphanumeric section 24, sometimes referred to as the QWERTY section, may include keys for each of the letters of the alphabet, each of the digits 0–9, and various punctuation symbols. The alphanumeric section 24 may alternatively be a subset of these keys. The editing section 26, preferably located immediately to the right of the alphanumeric section 24, preferably includes four arrow keys, Delete, Home, End, PageUp, and PageDown keys. The numeric section 28, is preferably to the right of the editing section 26. The numeric section 28 preferably includes digit keys 0–9, arithmetic function keys /, *, −, and +, a decimal separator key, and an Enter key. In a preferred arrangement, the Tab key is located in the numerical section where the NumLock key normally resides in many prior art keyboards. The function section 29 preferably includes a horizontal row of keys behind the alphanumeric section 24, editing section 26, and numeric section 28. In a preferred arrangement, twelve keys are located behind the alphanumeric section 24 and are preferably grouped and labeled for at least an associated function as shown.

In a preferred arrangement, the editing section 26 includes a first key cluster 30 and a second key cluster 32 located at least partially behind the first key cluster 32. The first key cluster 30 preferably includes four cursor control keys. More specifically, it includes four arrow keys including an Up Arrow key 34, a Down Arrow key 36, a Right Arrow key 38, and a Left Arrow key 40. These keys 34, 36, 38, and 40 move the cursor move the cursor up, down, right, and left, respectively, in a manner known in the art.

The second key cluster 32 includes additional editing keys and preferably includes a Home key 42, an End key 44, a Delete key 46, a PageUp key 48, and a PageDown key 50.

As seen in FIGS. 2 and 3, these five keys 42, 44, 46, 48, and 50 form an array that can generally be defined as having two columns and three rows, producing six relative cells or spots. In the arrangement as shown, the Home key 42, the End key 44, the PageUp key 48, and the PageDown key 50 each occupy a single spot or cell in the two-by-three array. The Delete key 46 is larger than the other keys in the cluster 32 and preferably occupies two cells. More specifically, the Delete key 46 preferably occupies the two lower rows in the left column. This is advantageous as the increased size Delete key 46 is one of the most frequently used editing keys.

Preferably, the editing section 26 including the second key cluster 32 lacks an Insert key. In addition, the entire editing section 26 and the keyboard 20 are preferably void of a primarily labeled Insert key. Many prior art keyboards have an Insert key and a Delete key placed immediately next to each other, with the Insert key being immediately behind the Delete key. However, due to such positioning, the Insert key is effectively a trap, as it is often pressed by accident. The inadvertent pressing of the Insert key can cause the user to make unintended changes to the open document. As described in conjunction with the Function Lock key 100, the functionality of the rarely used Insert key is preserved via a dual-mode key 86 positioned behind the numeric section 28.

The function section 29, that is the region corresponding to zones ZF0, ZF2, ZF3, and ZF4 in FIG. 1, preferably has of a single row of keys. These keys preferably include, from left to right: an isolated Escape key 54, a plurality of keys located behind the alphanumeric section 24, a key cluster 52 or group behind the editing section 26, and a key cluster 56 or group located behind the numeric section 56.

The key group behind the alphanumeric section 24 preferably includes a plurality of laterally spaced key clusters 58, 60, 62, and 62. The keys within each cluster are preferably primarily labeled as single command keys. That is, the normal pressing of any of these keys will cause a command to be performed corresponding to its primarily labeled indicia. The keys are preferably grouped to increase efficiency of use. In one embodiment, the keys may be clustered or grouped by "like" commands. Thus, keys for file level commands commonly performed in different applications, such as New, Open, Save, and/or Close, may be grouped together in a cluster. Keys for commands performed near the completion of a word processing document, e.g., Document Completion keys, such as, Spell (which produces a Spell Check), Grammar (which produces a Grammar Check), Update (for data in Tables and Charts), Save, and/or Print, may also be grouped together. In another embodiment, the keys may be also grouped by commands for a specific application type. For example, keys for frequently used E-mail commands, such as, New, Open, Reply, Forward, Send, Close, and/or Delete, may be grouped together. Further, keys for commands relating to a certain genre or category may also be grouped together in a key cluster. For example, keys for commands that are "user assisting" in nature, like help and searching relating commands can be grouped together. Thus, in one embodiment, keys for Help, Find, and Desktop (i.e., Minimize All) are in a key cluster.

The keys may also be ordered within each cluster to increase efficiency of use. In one preferred ordering scheme, the keys may be ordered left-to-right in chronological order of use. For example, a computer user will likely open a file (using Open) before closing it (using Close). In another chronological grouping, a user using e-mail will Open incoming mail, Reply or Forward it, and then Send it with his or her comments. The keys may also be selected and/or ordered to correspond to the command icons on a Graphical User Interface (GUI). For example, the keys may be ordered to replicate the order of selected icons on a graphical command toolbar.

The use of three keys in one or more clusters 58, 60, 62, and 64 in the illustrated embodiment improves the effectiveness of these keys. This grouping in threes is advantageous as many applications have functions that can be thought to fall into groups of three. In an exemplary arrangement, the key clusters 58, 60, 62, and 64 behind the alphanumeric or QWERTY section 24 consist of one or more clusters of exactly three keys. As shown, the keyboard 20 may have four laterally adjacent key clusters 58, 60, 62, and 64 each consisting of three keys. In one exemplary embodiment, one key group 58 may include and/or consist of a Help key 70, a Find key 71, and a Desktop key 72. The Find key 71 may be configured to produce a "Find" command or a "Find and Replace" command. The Desktop command minimizes the size of all open applications and shows the desktop display of graphical user interface and its icons. Another key group 60 preferably includes and/or consists of file level command keys such as a New key 73, an Open key 74, and a Close key 75. Another key cluster 62 behind the alphanumeric section 24 may include and/or consist of E-mail commands such as a Reply key 76, a Forward key 77, and a Send key 78. In yet another key group 64 behind the numeric section 24, the set of keys can include document finishing command keys including and/or consisting of a Spell key 79, a Save key 80, and a Print key 81.

In an alternative arrangement, not shown, the Find key 71 and the Desktop key 72 are replaced by Office Home and Task Pane keys, respectively. Such an Office Home key would launch a web browser and take the user to a predefined URL if desired. Such a Task Pane key would display a graphical user interface enabling the user to select a choice from a number of "tasks" such as searching, editing, etc.

The command keys 70–81 are preferably primarily labeled as or according to the command they perform when pressed. As shown in FIG. 2, these keys are each secondarily labeled as a standard function key, i.e., as one of F1 to F12. In one embodiment, the indicia corresponding to the command is printed on the top surface of each key to indicate its primary use, and the indicia indicating its secondary use as a standard function key is printed on the less visually apparent front face. In other embodiments of the invention, not shown, the primary command indicia may be made more prominent than the secondary indicia by the use of color contrast and/or size in addition to or in lieu of the placement of the indicia on different key surfaces.

The keyboard 20 also has a Function lock key 100. The Function Lock key 100 is preferably positioned at back left of keyboard 20, behind the row of command keys 70–81. The Function Lock key 100 permits the keys 70–81 to behave as they are primarily labeled (i.e., as specific Command keys) when the Function Lock key 100 is in a first mode, or as they are secondarily labeled (i.e., as a specific standard function key) when the Function Lock key 100 is in a second mode. The Function Lock key 100 is preferably a locking key and will remain in its current mode unless it is pressed or otherwise activated again, whereupon it will switch modes. This key locking capability is similar to the operation of a Caps Lock key or a Num Lock key of existing keyboards. If desired, the Function Lock key 100 may be positioned within the row 29 of function keys, or in any other desirable location, in lieu of its depicted position.

In a preferred arrangement, the Function Lock Key 100 defaults to maintaining the keys 70–81 to behave in the first mode. However, in an alternative embodiment, the Function Lock Key 100 defaults to maintaining the keys 70–81 to behave in the second mode. This alternative arrangement may be beneficial for keyboards with sets of keys corresponding to certain non-English languages, such as keys that use iconic word representations, e.g., Japanese.

A function lock mode indicator 102 is provided in the form of an illuminated member such as an LED. This indicator 102 indicates the mode status of the Function Lock key 100. The indicator 102 is preferably located immediately proximate to or on the Function Lock key 10. This indicator 102 provides feedback to computer users whether the keys 70–81 are acting as Command keys (preferably indicated by the LED being in an OFF state) or as Standard Function (F1–F12) keys (preferably indicated by the LED being in an ON state).

Another key cluster 52 may be in the same row with key clusters 58, 60, 62, and 64 and may be located behind the editing section 26. This key group or cluster 52 may include an Undo key 84 and a Redo key 85. The two keys 84 and 85 are labeled in the present embodiment as Undo and Redo keys. These two keys are almost always considered by most users and in most software applications as a functional pair and are therefore preferably provided in the key cluster 52 consisting of exactly these two keys. The Undo key 84 may be behind and preferably the same width and exactly in line with the Home and Delete keys 42 and 46 of the Editing section 26. The Redo key 85 may be behind and preferably the same width and exactly in line with the End, PageUp, and PageDown keys 44, 48, and 50 of the Editing section 26. Accordingly, as shown, the width of the Undo/Redo key cluster 52 is the same as the width of the upper key cluster 32 in the Editing section 26. The grouping and placement of the Undo and Redo keys 84 and 85 are beneficial since they are normally both associated with editing functions.

The keyboard 20 preferably includes four function keys 86–89, in the same row as Command keys 70–81, and located in the same group or cluster 56 behind the numeric section 28. These keys 86–89 are the Equals "=" key 86, the Left Parenthesis "("key 87, the Right Parenthesis ")" key 88, and the Backspace key 89. These keys 86–89 are preferably primarily labeled as their primary command. These keys 86–89 are preferably also secondarily labeled with indicia to indicate that they may secondarily be used as Insert, Print Screen, Scroll Lock, and Pause/Break keys, respectively. As with keys 70–81, the keys 86–89 over the numeric section 28 preferably behave according to the mode of the Function Lock key 100. However, it is recognized that keys 86–89 may be controlled by a different locking key having mode control capabilities.

This key cluster 56 is beneficial for increasing the efficiency of numerical data input. Using many conventional keyboards, the user typically has to awkwardly take time to locate the Equals key and the Backspace key with the left hand on the main QWERTY or alphanumeric section or remove the right hand from the number pad and reach into the alphanumeric section to locate and activate such a key. The problem was even worse for the Left Parenthesis and Right Parenthesis keys 81 and 82, having to awkwardly take time to locate the digit 9 key and the digit 0 key, and simultaneously locate and activate a Shift key to change the function of the digit 9 key and the digit 0 key. Acquiring the primarily labeled keys 86–89 to provide these characters and commands is significantly more efficient than the conventional arrangement.

Additionally, the keyboard 20 preferably does not include a primarily labeled Num Lock key. To retain the ability to use the rarely needed Num Lock functionality, a key, such as the Tab key in the numeric section 28 may be secondarily labeled as a Num Lock key. The Function Lock key 100 would convert the Tab key to behave as a NumLock key in a manner as described relative to keys 70–81 and keys 86–89.

Further, the keys 70–81, keys 84–85, and keys 86–89 are preferably located within the natural finger extension range of the common user when he or she is using the alphanumeric section 24, editing section 26, and numerical section 28, respectively. In a first arrangement, as shown, the gap 99 on the housing 22 between the horizontal row of keys including keys 70–81, 84–85, and 86–89 and the top row of keys in the alphanumeric, editing, and numerical sections 24, 26, and 28 is preferably 6 mm. However, the present invention includes arrangements with gaps greater and smaller than 6 mm, including an arrangement, not shown, where there is no gap separating the rows of keys.

Additionally, the keyboard 20 preferably includes a plurality of "launch" or additional command keys 105. These keys 105 are preferably located behind the row of keys 70–81, 84–85, and 86–89. These keys 105 may be keys that launch various programs or routines when pressed. Preferred launch keys 105 for the keyboard 20 are preferably labeled for action for launching a word processing program such as WORD, a spreadsheet program such as EXCEL, a web browser program, a Mail program, a Calendar program, a Calculator, and/or may be additional command controls such as Mute, Volume Up, Volume Down, Log Off, and Sleep.

The relative locations between keys, key clusters, rows, and keyboard sections are preferably as shown in the figures. Thus, for example, while not specifically itemized, it is apparent from this specification that the Find key 71 is entirely directly behind the alphanumeric section 24.

It is recognized that in use, the keyboard 20 would preferably be coupled to a system, such as, but not necessarily, including a processor and software to run the application programs. The keys for the keyboard 20 may be operable to provide the desired commands to the system according to any known arrangement. Further, while the keyboard 20 in the figures is shown as being of the type physically separated from a computer or appliance, it is recognized that the keyboard may be structurally integrated into a computer, such as a laptop, or an appliance. Additionally, while the keys as shown are preferably of standard size and shape for computer keyboards, it is recognized that the invention herein-described invention shall be limited solely by the claims appended hereto.

What is claimed is:

1. A keyboard comprising:
   a plurality of keys, said plurality of keys each functioning as predetermined command keys in a first mode and standard function keys in a second mode;
   a function lock selector, said function lock selector being actuable to change the functionality of the plurality of keys between said first and second modes and maintain said selected mode until a subsequent actuation of said function lock selector is performed; and
   an alphanumeric section, said plurality of keys located behind said alphanumeric section, wherein
   said keys of said plurality of keys are arranged in a row, said row being spaced from said alphanumeric section, and
   said row includes first, second and third key clusters each consisting of exactly three keys.

2. The keyboard of claim 1, said row of keys further having a fourth key cluster laterally spaced from said first, second, and third key clusters, wherein said fourth key cluster consists of exactly three keys.

3. A keyboard comprising:
   a plurality of keys, said plurality of keys each functioning as predetermined command keys in a first mode and standard function keys in a second mode;
   a function lock selector, said function lock selector being actuable to change the functionality of the plurality of keys between said first and second modes and maintain said selected mode until a subsequent actuation of said function lock selector is performed; and
   an alphanumeric section, said plurality of keys located behind said alphanumeric section, wherein
   said keys of said plurality of keys are arranged in a row, said row being spaced from said alphanumeric section, and
   keys in said alphanumeric section form a key cluster in which each key of said key cluster is immediately adjacent or in close proximity to at least one other key of said key cluster and said key cluster is set apart from other keys on said keyboard by a distance larger than the spacing between adjacent keys of said key cluster and by a portion of a housing of said keyboard.

4. A keyboard comprising:
   a plurality of keys, each of said plurality of keys functioning as a predetermined command key in a first mode and a standard function key in a second mode, said predetermined command key functions including at least one of a file level command, a document completion command and an e-mail command, said plurality of keys being secondarily labeled as standard function keys;
   a function lock key, said function lock key being actuable to change the functionality of the plurality of keys between said first and second modes and maintain said mode until a subsequent actuation of said function lock key is performed;
   a function lock indicator that indicates whether the keys are operating in said first mode or in said second mode, and wherein said function lock indicator includes a light-emitting member located immediately proximate to said function lock selector; and
   an alphanumeric section, and wherein
   said light emitting member comprises an LED,
   keys in said alphanumeric section form a key cluster in which each key of said key cluster is immediately adjacent or in close proximity to at least one other key of said key cluster and said key cluster is set apart from other keys on said keyboard by a distance larger than the spacing between adjacent keys of said key cluster and by a portion of a housing of said keyboard,
   said plurality of keys is located behind said alphanumeric section, and
   said plurality of keys comprises 12 keys arranged in a row and not part of said alphanumeric section key cluster.

* * * * *

UNITED STATES PATENT AND TRADEMARK OFFICE
CERTIFICATE OF CORRECTION

PATENT NO. : 6,979,140 B2 Page 1 of 1
APPLICATION NO. : 10/948676
DATED : December 27, 2005
INVENTOR(S) : Hugh E. McLoone et al.

It is certified that error appears in the above-identified patent and that said Letters Patent is hereby corrected as shown below:

On page 2, item (56), under "Other Publications", in column 2, line 22, delete "Stand ard" and insert -- Standard --, therefor.

In column 1, line 44, delete "interchagably" and insert -- interchangeably --, therefor.

Signed and Sealed this

Eighteenth Day of August, 2009

David J. Kappos
*Director of the United States Patent and Trademark Office*